Figure 1:
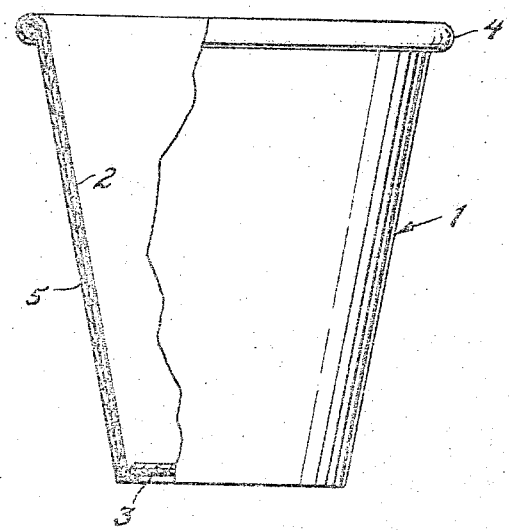

INVENTOR.
ALBERT L. McCONNELL
BY Harold L. Jenkins
ATTORNEY.

3,199,757
COMPOSITE PLASTIC CONTAINER
Albert L. McConnell, Chester, Pa., assignor to Scott Paper Company, Philadelphia, Pa., a corporation of Pennsylvania
Continuation of application Ser. No. 675,629, Aug. 1, 1957. This application Nov. 20, 1962, Ser. No. 246,644
3 Claims. (Cl. 229—1.5)

This application is a continuation of Serial No. 675,629, filed August 1, 1957, and now abandoned.

The present invention relates to containers and more particularly to containers formed of organic thermoplastics resins wherein is included supplementary insulating and reinforcing strata as an integral component.

It is well recognized that the customary form of single service paper container possesses numerous material disadvantages which impede general utilization thereof. The base stock of such containers is susceptible of mechanical deterioration and even disintegration when exposed to water base-liquids. Additionally, the usual paper container has a glued seam or joint which can be the source of failure, particularly when the container is employed in the handling of heated fluids. In order to obviate these use-limiting weaknesses, resin and wax coatings or impregnation of the base stock has been employed although such expedients have necessarily restricted the fields of applicability of the specially processed containers. For example, coated or filled paper stock, of a strength adequate to resist mechanical deterioration, will frequently occasion contamination of the materials brought into contact therewith. Manifestly, such material pollution is most undesirable. Furthermore, the increased cost of the specially processed containers reduces their commercial desirability and it is largely this cost factor which has precluded a more widespread adoption of resin impregnated and/or surfaced containers.

Material costs have similarly limited consideration of synthetic plastics as stock from which single service containers could be formed despite their increasing acceptance as substitutes for the more customary metallic, vitreous and ceramic substances entering common appliance and dishware manufactures with improved production techniques serving to enhance their desirability.

It is a principal object of the present invention to provide a strong, durable, leakproof container formed of an organic thermoplastic resinous material which will be competitive costwise with the more conventional paper containers, and which will be simple to manufacture.

It is a further object of my invention to provide a single service container formed of an organic thermoplastic resinous material with which has been combined a lateral insulating stratum or thermal barrier adapting said container as a receptacle of heated liquids.

Another object of my invention is to provide a single service container formed of a shaped organic thermoplastic resinous material with which has been combined a lateral reinforcing stratum to effect support of side walls.

Figure 2:
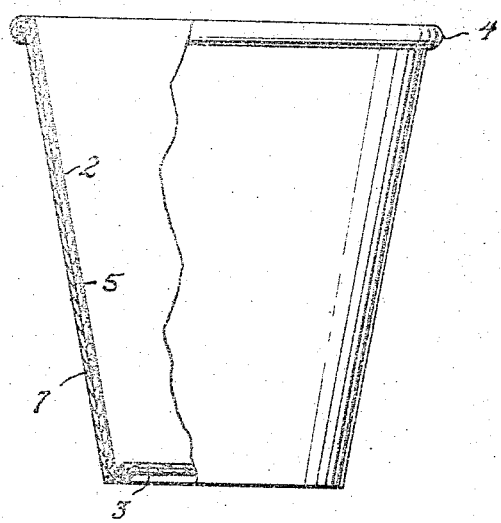

Other objects and advantages of my invention will be readily apparent from the following detailed description of certain preferred embodiments thereof when taken in conjunction with the accompanying drawing, wherein:

FIGURE 1 is a view in elevation with parts broken away to show a vertical section of a container constructed in accordance with the provisions of my invention, and FIGURE 2 is a similar view of another form of my invention.

Briefly stated, the present invention contemplates a unitary container of shaped organic thermoplastic resinous material wherein peripheral side walls are combined with a supplementary stratum adequate for their reinforcing support while additionally reducing thermal transmission therethrough.

Turning to the drawing, a container 1, which may be of any desired cross-sectional configuration although for convenience is depicted as being cup-shape, includes a peripheral side wall 2 and an integral bottom 3 of organic thermoplastic resinous material. The side wall 2 terminates in an upper rim 4 which provides a finished pouring lip for the container and also cooperates with the usual type of closure or frictionally engaging lid normally employed therewith.

As shown in FIGURE 1 of the drawing, the wall 2 and bottom 3 of the container include an exterior layer 5 composed of a cellulated organic thermoplastic material which may be of the same composition as the other material in the container 1 or if desired may be selected from a different thermoplastic resin. This layer 5 is integrated with the wall 2 and bottom 3 of the container 1 during the initial forming thereof, the drawing or molding operation serving to laminate and unite the separate layers of thermoplastic resin entering the composite article. The solid and cellulated layers of plastic may, of course, be united prior to the molding operation in order to minimize sheet displacement during handling, or if it is desired, the solid and cellulated layers of plastic may be shaped separately into conforming liner and envelop elements which are subsequently assembled in the composite container.

In the forming operation, the individual cells within the body of the cellulated plastic material will be elongated and there is imparted to the cellulated material and through it to the composite a rigidity greatly in excess of that of the unstretched sheet or of the base material of the wall 2. In addition, as is to be expected, the cellulated material will have a greatly reduced rate of thermal transmission therethrough, effectively insulating the composite container against heat losses through its side wall and bottom.

As shown in FIGURE 2, the insulating and reinforcing cellulated layer 5 may be disposed inwardly of the container 1 and if it is desired additional reinforcing 7 such as a mat of woven glass fibers, a mesh of suitable fibrous material or the like may be interposed between the layers of thermoplastic resin prior to their lamination and molding.

The several elements of the container 1 are shaped by standard plastic forming techniques, as for example, by vacuum assisted, plug molding of heated sheets of organic thermoplastic resins in multiple molds. The mechanics of such molding operations are well known to those skilled in the art and either fluid or mechanical pressure or a combination of both is equally satisfactory in obtaining the necessary plastic flow of the resinous material to conform it to the particular mold configuration. These practices generally result in attenuation of the intermediate portion of the sheeted plastic which enters into the side wall of the molded article and, while objectionable to many products, is in fact beneficial in the present case. A lesser amount of plastic material will be required in the formation of each container and accordingly this reduction in wall thickness is deliberately sought by a controlled, differential heating of the plastic affecting its flow characteristics, or by other means, such as regulation of the annular area to which material stretching may be substantially confined. Again the manner of controlling movement of the plastic material during the molding and forming operations, the edge clamping, localized heating, plug sizes and the like are well known and require no further amplification here.

Although a reduced weight of plastic material is involved in the formation of the container 1 making it more price competitive with the so-called single service paper container, the noted reinforcement of the composite side wall provides therefor the strength and rigidity necessary for normal usage. Lateral compression forces exerted against the side wall 2 exteriorly thereof will not cause an undesirable deformation or collapse of the container, which will be fully self-supporting and form-retaining.

One important factor to be considered in the present invention is that the reduced costs incident thereto enables successful competition on a price-per-unit basis with both paper and plastic containers of comparably size and use characteristics and provides a more satisfactory product to the ultimate consumer.

Although the composite container of my invention has a double thickness of material in its body, the weight thereof is considerably less than that of the conventional double wound, "hot-type," single service paper cup. My composite plastic container is an 8-ounce practical capacity size, will weigh approximately 7 grams, while the paper cup will weigh almost 50% more, that is, about 10 grams. The conventional injection molded plastic cup, which is devoid of the insulating characteristics of my composite container, in an equivalent size will weigh about 30% more, that is, about 9 grams.

Any of the conventional organic thermoplastic resinous materials may be employed in the production of containers as contemplated by my invention. The polystyrenes, including the nuclearly substituted alkyl styrenes, polyvinyl chlorides, polyvinylidene chlorides, polyalkylenes such as polyethylene, polypropylene or polybutylene, methyl methacrylates, acrylates, vinyl acetate-vinyl chloride copolymers and admixtures of different thermoplastic resins with themselves and with various fillers and extenders are readily moulded or drawn into containers of any desired cross-sectional configuration and dimensions. It is, of course, essential that the selected thermoplastic resin have good flow characteristics during the molding or drawing operations in order that dimensional controls will be possible. Manifestly, therefore, modification of the resinous materials to meet desired specifications should be possible. The incorporation therewith of any of the compatible plasticizers well known in the art, for example, dibutyl phthalate, dioctyl sebacate, cyclohexyl naphthenate and others, is contemplated. The resinous materials should also be susceptible of celluation or foaming through the inclusion therewith of gassing agents, vaporizable substances and the like and the techniques well known to those skilled in the art permit any desired degree of cellulation as well as control of cell size in order to meet specific characteristics in the ultimate composite sheet.

It is preferred to employ a polystyrene resin having a softening point of 180° F. or above as the basic plastic of my composite container and to use a polystyrene which has been cellulated and sheeted in accordance with the method described in U.S. Patent No. 2,023,204, issued December 3, 1935, to Munters et al. for the reinforcing and insulating layer which is integrated therewith. Matching sheets of plain and cellulated polystyrene are processed together to produce containers of any desired configuration and dimensions as established by the mold size and shape, the separate sheets being joined together into a composite unit during the molding or drawing operation.

*Example*

A polystyrene sheet having a thickness of 0.020" was heated to a temperature of about 200° F. and through conventional vacuum assisted plug molding, transformed into the conventional drinking cup of frusto-conical configuration. A cup of 8-ounce practical capacity weighed 4 grams and in the drawing operation, the thickness of the plastic in the side wall of the cup was diminished to from 0.004" to 0.010". Although the finished cup was self-supporting, the walls were objectionably flexible and compressible.

By combining a sheet of foamed polystyrene having a thickness of 0.030" with a sheet of unfoamed polystyrene of 0.020" thickness, and subjecting the assembly to the same molding operation, a cup was formed in which the side wall had a thickness of from 0.015" to 0.022" while its weight in an 8-ounce size was 7 grams.

The finished composite cup was self-supporting and the walls were only slightly flexible. The cullulated polystyrene layer reinforced and solid polystyrene layer and the united wall structure possessed a rigidity greatly in excess of that possible by mere increase in thickness of the solid polystyrene layer to an equivalent extent.

The layer of cellulated resin included within the container body constitutes an effective thermal barrier to enable comfortable handling of the container when it is filled with hot liquids. Additionally, the reduced heat transmission factor of the cellulated resin enhances its resistance to heat distortion and permits use of the composite container as a receiver for liquids heated to a temperature which would undesirably deform a plastic container not similarly protected. It has also been observed that both hot and cold liquids and foods will experience less rapid changes in original temperature during their retention in my composite container.

It will be readily apparent that various modifications in the selection of the elements entering the described container construction, their combination and arrangement are possible without departing from the spirit of the invention or the scope of the appended claims.

What I claim is:

1. A thermoplastic article of manufacture suitable for directly receiving contents usable for human consumption, the said container comprising a unitary circular side wall, a bottom seamlessly fully integrated with said side wall, and a circumferential lip, the said container characterized as having a side wall in a frusto-conical shape, tapering downwardly from a larger diameter adjacent to its upper end, seamlessly, fully integrated with said lip, the said side wall tapering to a smaller diameter and seamlessly, fully integrated with said bottom end, the said side wall, bottom and lip being substantially free from defects caused by wrinkles, folds and breaks in its structure, the said container having an outer shell of a polystyrene foam organic material, and an interior liner of a hard, smooth, scuff-resistant, enamel-like polystyrene solid material, said outer shell and liner being integrally united without interposition of an adhesive, the said circumferential lip being finished exposing the hard, enamel-like interior liner in a circumferential partial annulus at the said receiving opening of said frusto-conical container, the said side wall characterized by having one layer of said foam material, and one layer of an interior material of a unitary, seamless structure having the said outer foam material and the said interior material thermally, compositely united, the unitary side wall construction being self-supporting and substantially expandingly, non-bulging when said container is in a loaded condition, said side wall being paper-like and of a thickness of from about 0.015" to about 0.022", the said side wall being further characterized by the partial compressive flexibility and recovery of original shape without breaking and destroying the impermeability of said hard enamel-like interior liner, without breaking and permanently creasing the outer foam layer and without destroying the bond between the contiguous, thermally compositely united foam layer and said interior liner, the said side wall having a relatively rough surface in comparison with the interior due to the attenuated foam structure, the said foam structure imparting complementary rigidity to said more flexible interior liner, the said bottom characterized by being less flexible than said side wall, thereby imparting structural, dimensional stability to said flexible side wall, the said seamlessly, fully incorporated circumferential lip characterized by being less flexible than said side wall but more flexible than said bottom, the said lip thereby imparting dimensional stability by resisting breaking, the said container being further characterized by the seamless differential rigidity of said seamless bottom, seamless lip and seamless side wall, the differential rigidity in the unitary, continuous, seamless container co-acting to impart structural, dimensional stability to said container, the dimensional stability being characterized by a high volume ratio per total weight of container.

2. The thermoplastic article of manufacture of claim 1 wherein the total weight of an approximately 8-ounce by volume container is about 7 grams, and said frusto-conical shape defining a stackable cup article.

3. A thin-walled, thermoplastic, compositely united container comprised of a unitary, seamless structure of a side wall, a bottom seamlessly fully integral with said side wall, and a smoothly finished upper rim seamlessly fully integral with said side wall, said container having an exterior of at least one layer of an attenuated foam sheet of plastic material and an interior liner sheet of a hard, smooth, scuff-resistant, enamel-like plastic material, the said exterior and interior sheets being unitarily set without an interposed adhesive and being of a unitary, seamless, thermal-set construction, the said bottom being further characterized by being less flexible than said side wall, thereby imparting structural, dimensional stability to said flexible side wall, the said rim characterized by being more flexible than said bottom, but less flexible than said side wall to impart dimensional stability to said side wall to resist breaking, the unitary side wall construction imparting self-supporting properties due to individual complementary rigidities of said foam and said hard plastic liner, said unitary side wall having a thickness in excess of about 0.015" so as to the self-supporting, and substantially expandingly non-bulging when said container is in a loaded condition, the said side wall being further characterized by being paper-like of the thin-walled variety to possess partial compressive flexibility and recovery of original shape without breaking and destroying the impermeability of said hard enamel-like interior liner, without breaking and permanently creasing the outer foam layer, and without destroying the thermally bonded, unitary, composite of foam sheet and interior liner.

References Cited by the Examiner

UNITED STATES PATENTS

| | | | |
|---|---|---|---|
| 2,150,910 | 3/39 | Chaplin | 229—2.5 |
| 2,722,719 | 11/55 | Altstadter. | |
| 2,737,503 | 3/56 | Sprague | 260—2.5 |
| 2,834,533 | 3/58 | Carew | 229—1.5 |
| 2,917,217 | 12/59 | Sisson | 229—3.5 |
| 2,942,301 | 6/60 | Price et al. | |
| 3,037,652 | 6/62 | Wallace. | |

OTHER REFERENCES

"Foam and the Future," Modern Plastics, October 1950.

FRANKLIN T. GARRETT, *Primary Examiner.*
GEORGE O. RALSTON, *Examiner.*

UNITED STATES PATENT OFFICE
CERTIFICATE OF CORRECTION

Patent No. 3,199,757                                        August 10, 1965

Albert L. McConnell

It is hereby certified that error appears in the above numbered patent requiring correction and that the said Letters Patent should read as corrected below.

Column 3, line 10, for "comparably" read -- comparable --; column 4, line 8, for "culluated" read -- cellulated --; column 6, line 4, for "the" read -- be --.

Signed and sealed this 28th day of June 1966.

(SEAL)
Attest:

ERNEST W. SWIDER                                      EDWARD J. BRENNER
Attesting Officer                                         Commissioner of Patents